(12) United States Patent
Cong et al.

(10) Patent No.: US 10,761,072 B2
(45) Date of Patent: Sep. 1, 2020

(54) CHROMATOGRAPHY OF POLYMERS WITH REDUCED CO-CRYSTALLIZATION

(71) Applicant: Dow Global Technologies LLC, Midland, MI (US)

(72) Inventors: Rongjuan Cong, Lake Jackson, TX (US); Albert Parrott, Lake Jackson, TX (US); Cherry Hollis, Freeport, TX (US); Charles Michael Cheatham, Lake Jackson, TX (US)

(73) Assignee: DOW Global Technologies LLC, Midland, MI (US)

( * ) Notice: Subject to any disclaimer, the term of this patent is extended or adjusted under 35 U.S.C. 154(b) by 58 days.

(21) Appl. No.: 15/738,939

(22) PCT Filed: Aug. 24, 2016

(86) PCT No.: PCT/US2016/048268
§ 371 (c)(1),
(2) Date: Dec. 21, 2017

(87) PCT Pub. No.: WO2017/040127
PCT Pub. Date: Mar. 9, 2017

(65) Prior Publication Data
US 2018/0172648 A1    Jun. 21, 2018

Related U.S. Application Data

(60) Provisional application No. 62/211,464, filed on Aug. 28, 2015.

(51) Int. Cl.
*G01N 30/54* (2006.01)
*B01D 9/00* (2006.01)
(Continued)

(52) U.S. Cl.
CPC .......... *G01N 30/54* (2013.01); *B01D 9/0013* (2013.01); *B01D 15/10* (2013.01); *B01D 15/20* (2013.01);
(Continued)

(58) Field of Classification Search
CPC ........ G01N 30/54; G01N 30/30; B01D 15/10; B01D 15/20; B01D 15/206; B01D 9/0004; B01D 9/0013
See application file for complete search history.

(56) References Cited

U.S. PATENT DOCUMENTS 4,798,081 A    1/1989   Hazlitt et al.
9,095,792 B2   8/2015   Winniford et al.
(Continued)

FOREIGN PATENT DOCUMENTS

CN    103717285 A    4/2014
CN    104870488 A    8/2015
(Continued)

OTHER PUBLICATIONS

Hazlitt, Journal of Applied Polymer Science: Applied Polymer Symposium 45, 25-37 (1990).
(Continued)

*Primary Examiner* — Paul M. West
(74) *Attorney, Agent, or Firm* — Dinsmore & Shohl LLP

(57) ABSTRACT

A temperature gradient chromatography, and apparatus for the same, said method comprising the following: a) dissolving a composition comprising at least one polymer in at least one solvent, to form a polymer solution; b) injecting at least a portion of the polymer solution onto a support material and wherein the support material has a CI from 0.70 to 1.50; c) cooling the support material at a rate greater than, or equal
(Continued)

to, 0.2° C./min; d) increasing the temperature of the support material to elute at least some of the polymer; e) generating the chromatogram.

7 Claims, 6 Drawing Sheets

(51) Int. Cl.
*B01D 15/20* (2006.01)
*B01D 15/10* (2006.01)
*G01N 30/30* (2006.01)
*G01N 30/88* (2006.01)
*G01N 30/02* (2006.01)

(52) U.S. Cl.
CPC .......... *B01D 15/206* (2013.01); *G01N 30/30* (2013.01); *G01N 30/88* (2013.01); *B01D 9/0004* (2013.01); *B01D 9/0009* (2013.01); *G01N 2030/027* (2013.01); *G01N 2030/3076* (2013.01); *G01N 2030/885* (2013.01)

(56) References Cited

U.S. PATENT DOCUMENTS

| | | | |
|---|---|---|---|
| 9,115,275 | B2 | 8/2015 | Kupar et al. |
| 10,274,465 | B2 | 4/2019 | Cong et al. |
| 2006/0266708 | A1* | 11/2006 | Yu .................. G01N 30/463 210/656 |
| 2011/0152499 | A1 | 6/2011 | Winniford et al. |
| 2014/0090453 | A1 | 4/2014 | Cong et al. |
| 2014/0152499 | A1 | 6/2014 | Vosburgh et al. |

FOREIGN PATENT DOCUMENTS

| | | | |
|---|---|---|---|
| EP | 1021492 | A1 | 10/2004 |
| EP | 2008701 | A2 | 12/2008 |
| JP | 2000070339 | A | 3/2000 |
| JP | 2013133451 | A | 7/2013 |
| WO | 2010/042389 | A2 | 4/2010 |
| WO | 2012/166861 | A1 | 12/2012 |
| WO | 2017/040473 | A1 | 3/2017 |
| WO | 2017/058627 | A1 | 4/2017 |

OTHER PUBLICATIONS

Monrabal et al, Crystallizatoin Elution Fractionation and Thermal Gradient Interation Chromatography Macromolecular Symposia, 312, 1, Feb. 27, 2012, p. 115-129.
Nakano, S. et al, Development of Automatic Cross Fractionation: Combination of Crystallizability Fractionation and Moleculra Weight Fractionation, J of Applied Poly.Sci, (1981) V26, p. 4217-4231.
Pasch, H, et al, Recent Advances in High-Temperature Fraction of Polyolefins, Adv Polym Sci (2013) 251, 77-140.
Wild et al, Journal of Polymer Science, Poly. Phys. Ed., vol. 20, p. 441 (1982).
PCT/US2016/048268 Search Report dated Mar. 9, 2017.
PCT/US2016/048268 Written Opinion dated Mar. 9, 2017.
PCT/US2016/048268 IPRP dated Mar. 6, 2016.
International Preliminary Report on Patentability, relating to International Patent Application No. US2016/048268, dated Apr. 24, 2018.
First Office Action, Chinese patent application No. 20168004683.X, dated Nov. 1, 2019.
Chinese Search Report relating to Chinese patent application No. 20168004683.X, dated Oct. 27, 2019.
Yau, Wallace W. et al, "Examples of Using 3D-GPC TREF for Polyolefin Characterization", Macromol. Symp., 2007, pp. 29-45, vol. 257, No. 1.
Xue, Yan-Hu et al., Microstructure Characterization of Low Density Polyethylne by Temperature Rising Elution Fractionation, Acta Polymerica Sinica, Dec. 31, 2014, pp. 1576-1584, No. 12.

* cited by examiner

— Inventive method by using Gold coated nickel, with averaged particle size (D50) of 10.5 micron --- Comparative analysis by using soda-lime glass with an averaged particle size of 125 microns — Comparative analysis Soda-lime glass beads average particle size 125 microns --- Inventive analysis Gold coated nickel average particle size 10.5 microns — Blend of EO-A and EO-B at 50:50(wt:wt)

--- Mathematically generated data with the comparative analysis test by using glass bead 125 microns — Experimentally obtained the blend of EO-A and EO-B at 50:50(wt:wt) by using gold coated nickle particles --- Mathematically generated data with the comparative analysis test by the inventive analysis test with gold coated nickle particles ○     EO-B, density 0.9567, I2 1.0, I10/I2 6.7

△     EO-A, density 0.9239, I2 1.0, I10/I2 6.4

– – –     Experimentally obtained the blend of EO-A and EO-B at 50:50 (wt:wt) by using gold coated nickle particles ———     Mathematically generated data with the comparative analysis test by the inventive analysis test with gold coated nickle particles

US 10,761,072 B2

CHROMATOGRAPHY OF POLYMERS WITH REDUCED CO-CRYSTALLIZATION

REFERENCE TO RELATED APPLICATIONS

The present application claims the benefit of U.S. Provisional Application 62/211,464, filed Aug. 28, 2015.

BACKGROUND OF THE INVENTION

Comonomer content and distribution (CCD) and/or short chain branching distribution (SCBD) is one of the key parameters controlling polyolefin properties. A precise and accurate CCD analysis is critical for new product development. Current test methods use crystallization based (Crystallization Elution Fractionation (CEF) and Temperature Rising Elution Fractionation (TREF)), or an interaction based technique (High Temperature Thermal Gradient Interaction Chromatography, HT-TGIC, or TGIC). However, these techniques have limited resolution and exhibit coelution and/or co-crystallization. The most challenging issue in CEF, and/or all the other crystallization based separation techniques, is co-crystallization. In order to minimize the amount of co-crystallization, a slow cooling process such as 1.5° C./hour is used at a cost of analysis time. Thus, there is a need for chromatography techniques that reduce co-crystallization, and improve resolution and accuracy, and decrease analysis time. Crystallization based separation techniques are described in the following references: Hazlitt, *Journal of Applied Polymer Science: Applied Polymer Symposium* 45, 25-37 (1990); Wild et al, *Journal of Polymer Science, Poly. Phys. Ed.*, Vol. 20, p. 441 (1982)); EP2008701A1. JP 2013133451 discloses the use of narrow modulated temperature steps during cooling, about 5° C. per step, to improve the separation in temperature rising elution fractionation (TREF).

It was generally accepted that the crystallization process of TREF is largely controlled by the rate of crystal growth and the rate of nucleation. Wild et al. studied different cooling rates in TREF, and concluded that the support material (also commonly called column packing material) does not play a key role in TREF results (L Wild et al., Advances in Polymer Science 98, Springer-Verlag Berlin Heidelberg GmbH, P21). It had been widely accepted in the polyolefin industry, that glass, stainless shot, and crushed fire brick can be used as the column packing material, and these materials did not significantly change the final chromatography results.

However, as discussed above, there remains a need for chromatography techniques that reduce co-crystallization, and improve resolution and accuracy, and decrease analysis time. These needs have been met by the following invention.

SUMMARY OF THE INVENTION

A method to reduce the co-crystallization Index (CI) in a chromatogram generated by a temperature gradient chromatography, said method comprising the following:
 a) dissolving a composition comprising at least one polymer in at least one solvent, to form a polymer solution;
 b) injecting at least a portion of the polymer solution onto a support material and wherein the support material has a CI from 0.70 to 1.50;
 c) cooling the support material at a rate greater than, or equal to, 0.2° C./min;
 d) increasing the temperature of the support material to elute at least some of the polymer;
 e) generating the chromatogram.

A method to analyze a polymer solution using a temperature gradient chromatography, said method comprising the following:
 a) dissolving a composition comprising at least one polymer in at least one solvent, to form the polymer solution;
 b) injecting at least a portion of the polymer solution onto a support material and wherein the support material has a CI from 0.70 to 1.50;
 c) cooling the support material at a rate greater than, or equal to, 0.2° C./min;
 d) increasing the temperature of the support material to elute at least some of the polymer;
 e) generating a chromatogram.

Also an apparatus is provided for polymer chromatography, comprising at least one column that comprises a support material, and wherein the support material has a CI from 0.70 to 1.50, and wherein the support material comprises an inert material.

DETAILED DESCRIPTION

Figure 1:
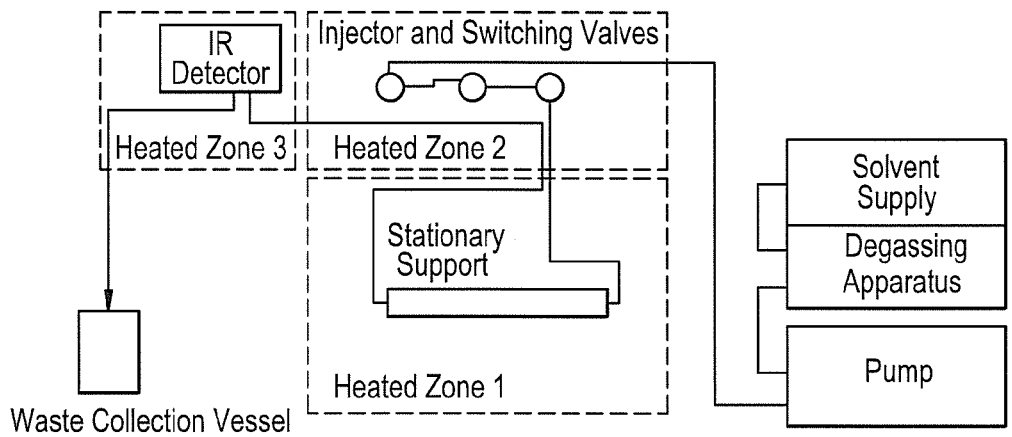
FIG. 1 depicts a schematic drawing of the set up for the inventive analysis.

New "crystallization based chromatography" methods have been discovered that inert substrate materials (such as gold coated particles) can be used to minimize co-crystallization in the analysis. It has further been discovered that the accuracy of CCD and/or SCBD analysis with the inventive methods is equivalent, or better than, the accuracy of the TREF method of Wild, and the inventive methods require less (for example, less than 5%) of analysis time of the Wild TREF method, for increased sample throughput. The inventive chromatography methods lead to stable and repeatable crystallization results, which, in turn, yield longer column life and more precise data.

In a first aspect, a method is provided to reduce the co-crystallization Index (CI) in a chromatogram generated by a temperature gradient chromatography; said method comprising the following:

a) dissolving a composition comprising at least one polymer in at least one solvent, to form a polymer solution;

b) injecting at least a portion of the polymer solution onto a support material and wherein the support material has a CI value from 0.70 to 1.50;

c) cooling the support material at a rate greater than, or equal to, 0.2° C./min;

d) increasing the temperature of the support material to elute at least some of the polymer;

e) generating the chromatogram.

"A method to reduce the co-crystallization Index (CI) in a chromatogram" refers to the reduction in the $A_f/A_0$ value, as discussed below, for the support material with CI from 0.70 to 1.50, as compared to the $A_f/A_0$ value of a support material with an $A_f/A_0$ value greater than 1.50, further greater than 1.55, further greater than 1.60; for example one of the following:

i) Glass beads at 125 microns, purchased from MO-SCI Specialty Products (4040 HyPoint North, Rolla, Mo. 65401 USA), with the part number of GL0191B6/125AW; particle size was 125 μm±6%, with a spherical percentage ≥90% according to MO-SCI Specialty Products;

ii) Yttrium-Stabilized Zirconia Micro at 112 to 125 microns (Catalogue # YSZMS-6.05, 112-125 um), purchased from Cospheric LLC (Santa Barbara, Calif., USA); the percentage of particles in the stated size range was reported as >90%;

iii) Soda lime, solid glass micro particles, with a particle size D50 of 9 microns (Catalogue # P2015SL from Cospheric LLC (Santa Barbara, Calif., USA));

iv) Silane coated soda lime, solid glass micro particles, with a particle size D50 of 10 microns (Catalogue # P2015SL-S2 from Cospheric LLC (Santa Barbara, Calif., USA));

v) Stainless steel particles (from VULKAN BLAST SHOT with Chronital 10, at diameter of 0.05-0.2 mm at mesh size of 170-100, washed and size fractionated.

In a second aspect, a method is provided to analyze a polymer solution using a temperature gradient chromatography, said method comprising the following:

a) dissolving a composition comprising at least one polymer in at least one solvent, to form the polymer solution;

b) injecting at least a portion of the polymer solution onto a support material and wherein the support material has a CI from 0.70 to 1.50;

c) cooling the support material at a rate greater than, or equal to, 0.2° C./min;

d) increasing the temperature of the support material to elute at least some of the polymer;

e) generating a chromatogram.

In a third aspect, an apparatus is provided for polymer chromatography, comprising at least one column that utilizes a support material, and wherein the support material has a CI from 0.70 to 1.50, and wherein the support material comprises an inert material.

An inventive method may comprise a combination of two or more embodiments as described herein.

An inventive apparatus may comprise a combination of two or more embodiments as described herein.

In one embodiment, for the first and second aspects, the temperature gradient chromatography is selected from the following: i) a crystallization elution fractionation (CEF) chromatography, or ii) a temperature rising elution fractionation (TREF) chromatography.

In one embodiment, for the first and second aspects, the polymer is an olefin-based polymer.

In one embodiment, for the first and second aspects, for step d), the temperature of the support material is increased at a rate greater than, or equal to, 0.5° C./min, further greater than, or equal to, 1.0° C./min, further greater than, or equal to, 1.5° C./min, further greater than, or equal to, 2.0° C./min, further greater than, or equal to, 3.0° C./min, further greater than, or equal to, 4.0° C./min, further greater than, or equal to, 5.0° C./min, further greater than, or equal to, 6.0° C./min, further greater than, or equal to, 7.0° C./min, further greater than, or equal to, 8.0° C./min, further greater than, or equal to, 9.0° C./min.

In one embodiment, for step c), a flow of eluent is maintained through the support material. In one embodiment, for the first and second aspects, for step c), eluent flows through the support material at a rate less than, or equal to, 0.5 ml/min.

In one embodiment, for the first and second aspects, for step c), the support material is cooled at a rate ≥0.25° C./min, further ≥0.30° C./min, further ≥0.40° C./min, further ≥0.50° C./min, further ≥1.0° C./min, further ≥1.5° C./min, further ≥2.0° C./min, further ≥3.0° C./min, further ≥4.0° C./min, further ≥5.0° C./min, further ≥6.0° C./min, further ≥7.0° C./min, further ≥8.0° C./min, further ≥9.0° C./min, further ≥10.0° C./min, further ≥11.0° C./min, further ≥12.0° C./min.

In one embodiment, for the first and second aspects, in step c), the support material is cooled at a rate greater than 6.0° C./min, further greater than 8.0° C./min, further greater than 10.0° C./min, further greater than 12.0° C./min, further greater than 14.0° C./min.

In one embodiment, for the first and second aspects, in step c), the flow rate of the eluent, through the support material, is maintained at less than, or equal to, 0.4 mL/min, further less than, or equal to, 0.3 mL/min, further less than, or equal to, 0.2 mL/min, further less than, or equal to, 0.1 mL/min, further less than, or equal to, 0.05 mL/min, further less than, or equal to, 0.02 mL/min, further less than, or equal to, 0.01 mL/min.

In one embodiment, for the first and second aspects, in step d), the flow rate of the eluent, through the support material is from 0.5 to 3.0 mL/min, or from 0.5 to 2.0 mL/min, or from 0.5 to 1.0 mL/min.

In one embodiment, for the first and second aspects, in step d), the temperature of the support material is increased at a rate greater than, or equal to, 1.0° C./min, further greater than, or equal to, 2.0° C./min, further greater than, or equal to, 3.0° C./min, further greater than, or equal to, 4.0° C./min, further greater than, or equal to, 5.0° C./min.

In one embodiment, for the first and second aspects, in step d), the temperature of the support material is increased at a rate greater than, or equal to, 6.0° C./min, further greater than, or equal to, 7.0° C./min, further greater than, or equal to, 8.0° C./min, further greater than, or equal to, 9.0° C./min, further greater than, or equal to, 10.0° C./min.

The following embodiments described herein apply to both the first, second and third aspects discussed above, unless otherwise noted.

In one embodiment, the polymer is an olefin-based polymer.

In one embodiment, the CI value is from 0.70 to 1.45, further from 0.70 to 1.40, further from 0.70 to 1.35, further from 0.70 to 1.30, further from 0.70 to 1.25, further from 0.70 to 1.20.

In one embodiment, the support material has a thermal conductivity greater than 95 W/mK, further greater than 95 W/mK, measured at 25° C. using ASTM Method C518-10.

In one embodiment, the support material has a surface composition comprising one or more metals, and wherein each metal, in its elemental form, has an Electronegativity ≥2.2. The Electronegativity is that for the elemental metal, even if the metal is in the form of an oxide or salt.

In one embodiment, the support material comprises spherical particles that have $D_{50}$ value less than, or equal to, 100 microns. In one embodiment, the support material comprises spherical particles that have $D_{50}$ value greater than, or equal to, 5 microns, or greater than, or equal to, 10 microns, or greater than, or equal to, 20 microns.

In one embodiment, the support material comprises a median particle size diameter, $D_{50}$ from 5 to 100 μm, or from 10 to 80 μm, or from 10 to 50 μm.

In one embodiment, the support material has $D_{50} \geq 2$ microns, or ≥5 microns, or ≥10 microns, or ≥20 microns. In one embodiment, the support material has a $D_{50} < 50$ μm, or <40 μm, or <30 μm, or <20 μm, or <10 μm, or <5 μm.

In one embodiment, the support material has a $D_{50}$ from 2 to 100 microns, further from 5 to 80 microns, further from 5 to 50 microns. In a further embodiment, the support material comprises >90 vol % spherical particles.

In one embodiment, the support material has a $D_{50}$ from 2 to 40 microns, further from 5 to 30 microns, further from 10 to 20 microns, further from 2 to 10 microns. In a further embodiment, the support material comprises >90 vol % spherical particles.

In one embodiment, the support material has a particle size distribution, such that $D_{10} \geq 2$ microns, $D_{90} \leq 3.1 \times D_{50}$, and the ratio of $(D_{90}-D_{10})D_{50} < 3.0$, further <2.0, further <1.5, and further <1.3.

In one embodiment, the solvent comprises less than 200 ppm water, based on the weight of the solvent.

In one embodiment, the durability of the support material meets the following equation: $H_I = mx + B$, where m<0.007, and wherein the equation has a linear regression correlation coefficient $R^2 \leq 0.25$; and wherein x=number of the consecutive injection of a reference material, and wherein x is from 1 to 40; and, for each x value, $$H_I = \frac{\int_{T_V}^{upper\ intergration\ limit} dW_f/dT * dT}{\int_{T_{SF}}^{upper\ intergration\ limit} dW_f/dT * dT} * 100\%.$$

In a further embodiment, the reference material is DOWLEX 2056A Polyethylene Resin or DOWLEX 2045 Polyethylene Resin, and further DOWLEX 2045 Polyethylene Resin.

In one embodiment, the support material has a surface coating layer, and wherein the thickness of the coating layer is from 10 nm to 100 nm, or from 20 nm to 100 nm. In one embodiment, the support material has a surface coating layer, and the thickness of the coating layer is from 5 nm to 200 nm, or from 10 nm to 200 nm, or from 20 nm to 200 nm.

In one embodiment, the support material comprises one of the following: a) gold particles, b) gold coated particles (for example, gold coated nickel), c) particles comprising gold, d) particles comprising a coating comprising gold, e) silver particles, f) silver coated particles, g) particles comprising silver, h) particles comprising a coating comprising silver, i) platinum particles, j) platinum coated particles, k) particles comprising platinum, l) particles comprising a coating comprising platinum, m) palladium particles, n) palladium coated particles, o) particles comprising palladium, p) particles comprising a coating comprising palladium, q) copper particles, r) copper coated particles, s) particles comprising copper, t) particles comprising a coating comprising copper, or u) a combination thereof. In a further embodiment, the particles comprise ≥90 wt % of the support material, based on the weight of the support material. In a further embodiment, the particles comprises ≥95 wt %, further ≥98 wt %, further ≥99 wt % of the support material, based on the weight of the support material.

In one embodiment, the support material comprises one of the following: a) gold particles, b) gold coated particles (for example, gold coated nickel), c) particles comprising gold, d) particles comprising a coating comprising gold, e) silver particles, f) silver coated particles, g) particles comprising silver, h) particles comprising a coating comprising silver, i) platinum particles, j) platinum coated particles, k) particles comprising platinum, l) particles comprising a coating comprising platinum, m) palladium particles, n) palladium coated particles, o) particles comprising palladium, p) particles comprising a coating comprising palladium, or q) a combination thereof. In a further embodiment, the particles comprise ≥90 wt % of the support material, based on the weight of the support material. In a further embodiment, the particles comprises ≥95 wt %, further ≥98 wt %, further ≥99 wt % of the support material, based on the weight of the support material.

In one embodiment, the support material comprises one of the following: a) gold particles, b) gold coated particles (for example, gold coated nickel), c) particles comprising gold, d) particles comprising a coating comprising gold, e) copper particles, f) copper coated particles, g) particles comprising copper, h) particles comprising a coating comprising copper, or i) a combination thereof. In a further embodiment, the particles comprise ≥90 wt % of the support material, based on the weight of the support material. In a further embodiment, the particles comprises ≥95 wt %, further ≥98 wt %, further ≥99 wt % of the support material, based on the weight of the support material.

In one embodiment, the support material comprises one of the following: a) gold particles, b) gold coated particles (for example, gold coated nickel), c) particles comprising gold, d) particles comprising a coating comprising gold, or q) a combination thereof. In a further embodiment, the particles comprise ≥90 wt % of the support material, based on the weight of the support material. In a further embodiment, the particles comprises ≥95 wt %, further ≥98 wt %, further ≥99 wt % of the support material, based on the weight of the support material.

In one embodiment, the support material comprises gold particles, gold coated particles (for example, gold coated nickel), or a combination thereof. In a further embodiment, the particles comprises ≥90 wt % of the support material, based on the weight of the support material. In a further embodiment, the particles comprises ≥95 wt %, further ≥98 wt %, further ≥99 wt % of the support material, based on the weight of the support material.

In one embodiment, the support material comprises a material comprising at least one inert metal.

In one embodiment, the "support material" is thermally stable at a temperature range from −15° C. to 230° C. In one embodiment, the "support material" is chemically stable at a temperature range from −15° C. to 230° C. In one embodiment, the "support material" is thermally and chemically stable at a temperature range from −15° C. to 230° C.

Chemically stable means that the support material does not undergo chemical reaction with mobile phase or with polymer solution; and does not undergo thermal decomposition. Thermally stable describes a stationary phase that does not undergo substantial thermal expansion or contraction, which expansion or contraction causes the column bed to move or to generate voids, or which causes deterioration of the column performance in a relatively short period of time.

In one embodiment, the olefin-based polymer has a density from 0.850 to 0.980 g/cc, or from 0.860 to 0.960, or from 0.870-0.940 g/cc (1 cc=1 cm$^3$).

In one embodiment, the olefin-based polymer is an ethylene-based polymer.

In one embodiment, the olefin-based polymer is a propylene-based polymer.

In one embodiment, the apparatus of the third aspect, further comprises a means to subject the support material to a temperature gradient. In a further embodiment, the temperature gradient (cooling or heating) is greater than, or equal to, 0.5° C. per minute, or greater than, or equal to, 1.0° C. per minute, or greater than, or equal to, 2.0° C. per minute.

A temperature gradient device (for example, a GC oven (Agilent Technologies), used in a CEF from PolymerChar) is an instrument that is used to thermally treat, or cool, a column (for example, a chromatography column) in a controlled manner. Other examples are Hewlett Packard GC ovens, and Analytical TREF ovens (for example, see Gillespie et al., U.S. 2008/0166817A1).

In one embodiment, the apparatus further comprises a means to subject the support material to a solvent gradient.

A solvent gradient device (for example, a dual pump system with a mixer (Agilent Technologies) as available from PolymerChar) is an instrument that is used to mix two or more solvents in a controlled manner, and wherein the solvent mixture is used as an eluent in a column (for example, a chromatography column). Examples include binary Shimadzu LC-20 AD pumps (see Roy et al, *Development of Comprehensive Two-Dimensional High Temperature Liquid Chromatography×Gel Permeation Chromatography for Characterization of Polyolefins*, Macromolecules 2010, 43, 3710-3720) and binary Agilent pumps from HT-LC instrument (PolymerChar).

In one embodiment, apparatus further comprises a means to subject the support material to a temperature gradient, and a means to subject the support material to a solvent gradient, for example, by using a combination of at least one oven and at least one pump as described above. In a further embodiment, the temperature gradient is greater than, or equal to, 0.1° C. per minute, or greater than, or equal to, 1.0° C. per minute, or greater than, or equal to, 2.0° C. per minute.

In one embodiment, the apparatus further comprises a second support material that is different from the first support material. For example, the second support material may differ from the first support material in one or more features, such as, chemical composition, mean particle size, particle size distribution, pore size and/or pore size distribution.

In one embodiment, the apparatus further comprises a means to subject the second support material to a temperature gradient, for example by a combination of the ovens and pumps in the PolymerChar apparatus described above. In a further embodiment, the temperature gradient is greater than, or equal to, 0.1° C. per minute, or greater than, or equal to, 1.0° C. per minute, or greater than, or equal to, 2.0° C. per minute. Suitable temperature gradient devices are discussed above.

In one embodiment, the apparatus further comprises a means to subject the second support material to a solvent gradient. Suitable solvent gradient devices are discussed above.

In one embodiment, the apparatus further comprises a means to subject the second support material to both a temperature gradient and a solvent gradient, for example, by using a combination of at least one oven and at least one pump as described above. In a further embodiment, the temperature gradient is greater than, or equal to, 0.1° C. per minute, or greater than, or equal to, 1.0° C. per minute, or greater than, or equal to, 2.0° C. per minute.

In one embodiment, the apparatus is connected, in-line, at-line or on-line, to either a polymerization process or an isolation process of the polymer.

In one embodiment, the second support material comprises at least one filler (for example, an inert filler). Fillers include, but are not limited to, inorganic materials, such as, but not limited to, glass, and stainless steel shot.

In one embodiment, the second support material comprises greater than, or equal to 50 weight percent filler (for example, an inert filler), or greater than, or equal to 60 weight percent filler, based on the weight of the second support material. In one embodiment, the at least one filler is in the form of spheres. In a further embodiment, the spheres have a diameter from 2 to 150 microns, or from 5 to 125 microns, or from 7 to 50 microns.

In one embodiment, the liquid flowing through the support material is a strong eluent. Examples of strong eluents include, but are not limited to, 1,2-dichlorobenzene, 1,2,4-trichlorobenzene, and tetrachloroethylene.

In one embodiment, the liquid flowing through the support material is a weak eluent. Examples of weak eluent include, but are not limited to, decanol, diphenyl ether, decane, and ethylene glycol monobutyl ether (EGMBE).

In one embodiment, the liquid flowing through the support material is a mixture of weak eluent and strong eluent Examples of the mixture of weak eluent and strong eluent include, but are not limited to, mixture of decanol with 1,2,4-trichlorobenzene, decane with 1,2-dichlorobenzene, and ethylene glycol monobutyl ether (EGMBE) with 1,2-dichlorobenzene.

In one embodiment, the polymer has a concentration in the solution of greater than 0.1 milligrams polymer per milliliter of solution. In a further embodiment, the polymer is an olefin-based polymer.

An inventive method can be coupled, on or off line, with other analytical methods. For example, the effluent from an SEC column containing a copolymer of a selected molecular size can be analyzed by Temperature Rising Elution Fractionation (TREF), or Crystallization Elution Fractionation (CEF) to determine the comonomer ratio of the selected molecular sizes. See also Roy et al., *Development of Comprehensive Two-Dimensional High Temperature Liquid Chromatography×Gel Permeation Chromatography for Characterization of Polyolefins*, Macromolecules (2010), 43, 3710-3720; Gillespie et al., "APPARATUS AND METHOD FOR POLYMER CHARACTERIZATION", US2008/0166817A1; each incorporated herein by references.

An inventive method can be used in a preparative scale, where large quantity of polymer (in the term of grams, kilograms) is fractionated according to its CCD.

An inventive method can be used in at-line process control and/or quality control to provide a fast feedback of CCD and/or SCBD for olefin-based polymer.

An inventive method may comprise a combination of two or more embodiments as described herein.

An inventive apparatus may comprise a combination of two or more embodiments as described herein.

The support material may comprise a combination of two or more embodiments as described herein.

The second support material may comprise a combination of two or more embodiments as described herein.

Co-Crystallization

In the determination of the comonomer content and distribution analysis (CCD) or short chain branching analysis (SCBD), co-crystallization (also, commonly named as co-elution) refers to the phenomenon that polymer chains (for example, olefin-based polymer chains) with similar, but different, microstructures may form crystals together and/or elute together, leading to errors in the reported CCD or SCBD. Co-crystallization is one of the key factors limiting the resolution and the test accuracy of crystallization-based techniques, which include crystallization analysis fractionation (CRYSTAF, Monrabal, U.S. Pat. No. 5,222,390), temperature rising elution fractionation (TREF, L Wild et al., Advances in Polymer Science 98, Springer-Verlag Berlin Heidelberg GmbH, P21, and reference cited) and crystallization elution fractionation (CEF, Monrabal et al, Macromol. Symp. 257, 71-79 (2007)). Quantifying the degree of co-crystallization in an unknown multi-component system is very challenging. As a result of co-crystallization, it is difficult to model or deconvolute the results from CRYSTAF, TREF, or CEF (a high throughput TREF, which runs a TREF type of experiment at a fraction of conventional TREF analysis time, by having a slow flow during cooling process (Monrabal, EP 2 008 701 B1)).

Co-crystallization is an inherent characteristic of crystallization based separation techniques. It is well known in the art that reducing cooling rate, such as 0.025° C./min, as in the Wild TREF experiment, reduces the amount of co-crystallization. The Wild TREF, using a cooling rate of 0.025° C./min has been widely accepted as the golden standard for SCBD analysis, at a cost of very long analysis time (4500 minutes per samples after sample solution has been loaded to the TREF column).

Definition of Co-Crystallization Index (CI)

The co-crystallization index (CI) is defined as the following, wherein $CI = A_I/A_O$, where $A_I$ is the peak area of the highest temperature elution peak of DOWLEX 2056A or DOWLEX 2045, obtained from CEF or TREF analysis, and $A_O$ is the peak area of the same peak of the same material, determined by using the experimental conditions of Wild (Wild et al, *Journal of Polymer Science, Poly. Phys. Ed.*, Vol. 20, p. 441 (1982)), using the silica based support material CHROMOSORB® PNAW that has a diameter range from 210 to 250 microns. The support material used for the determination of $A_I$ is not CHROMOSORB PNAW that has a diameter range from 210 to 250 microns.

Either DOWLEX 2045 LLDPE ((density=0.920 g/cc, I2=1.0 g/10 min, I10/I2=8.0 (target properties) or DOWLEX 2056A LLDPE (density=0.920 g/cc, I2=1.0 g/10 min, I10/I2=8.0 (target properties)) can be used to calculate CI. When calculating CI, it is noted that CEF and Wild TREF, or TREF and Wild TREF are performed on the same lot of the same material. The calculation of CI includes the following steps:

(1) Obtain the SCBD distribution by CEF (see Test Methods section below) or TREF (see Test Methods section below), which displays the "$dW_f/dT$ versus elution temperature," where $dW_f/dT$ is the weight fraction ($W_f$) of the polymer eluting at temperature of T;

(2) Determine the elution temperature valley for soluble fraction, $T_{SF}$, where $T_{SF}$ is defined as the elution temperature at which the soluble fraction peak returns to baseline or nearly to baseline. From the SCBD distribution, $T_{SF}$ is the elution temperature at the peak valley between the low integration limit and 40° C. (for example, see FIG. 2);

(3) Determine the elution valley temperature ($T_v$) at the peak valley of the highest temperature elution peak. The valley should lie between 86° C. and 100° C., where it is the minimum height between 86° C. and 100° C. (see FIG. 2);

(4) Calculate the peak area (%) of the highest temperature elution peak ($A_I$):

$$A_I = \frac{\int_{T_v}^{upper\,intergration\,limit} dW_f/dT * dT}{\int_{T_{SF}}^{upper\,intergration\,limit} dW_f/dT * dT} * 100\%;$$

Figure 3:
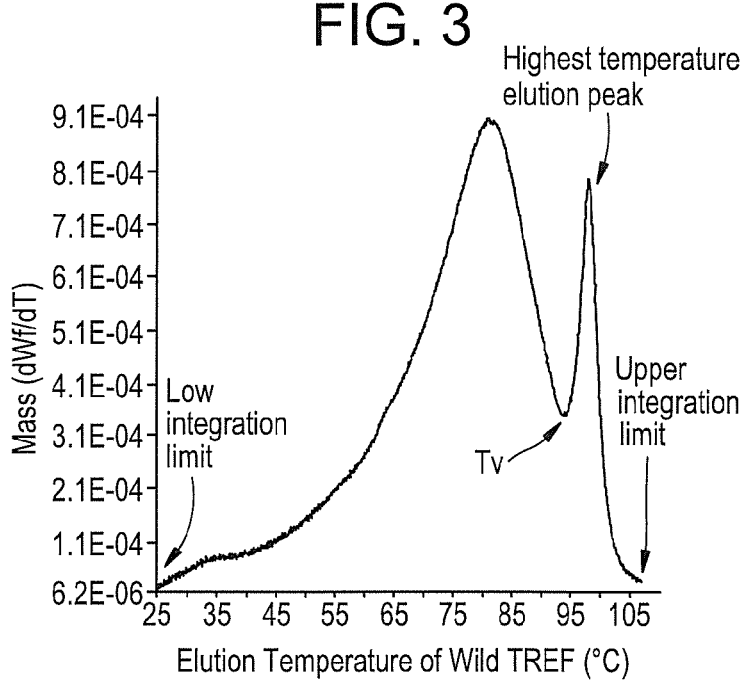
FIG. 3 is a TREF chromatogram of DOWLEX 2056A, which is noted for the calculation of $A_0$.

(5) Obtain the SCBD distribution of the same material by Wild TREF displaying "$dW_f/dT$ versus elution temperature," where $dW_f/dT$ is the weight fraction ($W_f$) of the polymer eluting at elution temperature of T;

(6) Determine the elution valley temperature ($T_v$) at the peak valley of the highest temperature elution peak, by searching from the elution temperature from 86° C. toward 100° C., where a peak valley is the minimum height between 86° C. and 100° C. by using SCBD obtained by Wild TREF (for example, see FIG. 3);

(7) Calculate $A_o$ from SCBD distribution obtained with Wild TREF, as follows:

$$A_o = \frac{\int_{T_v}^{upper\,intergration\,limit} dW_f/dT * dT}{\int_{Low\,intergration\,limit}^{upper\,intergration\,limit} dW_f/dT * dT} X100\%;$$

(8) Calculate CI from $A_I$ and $A_O$:

$$CI = \frac{A_I}{A_o}.$$

For DOWLEX 2056A, $A_O$ is 13.4%.

Figure 2:
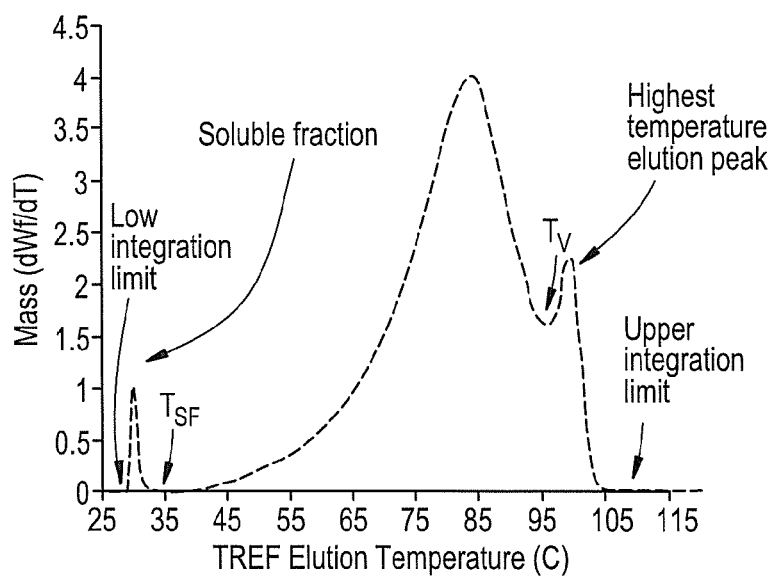
FIG. 2 is a TREF chromatogram of DOWLEX 2056A, which is noted for the calculation of $A_I$.

For example, see FIGS. 2 and 3. For the calculation of $A_I$ from the SCBD distribution obtained from TREF, the sample is DOWLEX 2056A—see FIG. 2. For the calculation of $A_o$ from the SCBD distribution obtained from Wild TREF, the sample is DOWLEX 2056A—see FIG. 3.

Polymers

The inventive analysis can be used to measure CCD and/or SCBD for olefin-based polymers, such as ethylene-based polymers, and propylene-based polymers.

Olefin-Based Polymers

In one embodiment, the olefin-based polymer is an ethylene-based polymer.

In one embodiment, the olefin-based polymer is an ethylene/alpha-olefin interpolymer. In a further embodiment, the alpha-olefin is a C3-C10 alpha-olefin, and preferably selected from propylene, 1-butene, 1-hexene, and 1-octene.

In one embodiment, the olefin-based polymer is an ethylene/alpha-olefin copolymer. In a further embodiment, the alpha-olefin is a C3-C10 alpha-olefin, and preferably selected from propylene, 1-butene, 1-hexene, and 1-octene.

In one embodiment, the olefin-based polymer is a copolymer of ethylene and an alpha-olefin. In a further embodiment, the alpha-olefin is 1-butene or 1-octene.

In one embodiment, the olefin-based polymer is a polyethylene homopolymer.

In one embodiment, the olefin-based polymer is a propylene-based polymer.

In one embodiment, the olefin-based polymer is a propylene/alpha-olefin interpolymer. In a further embodiment, the alpha-olefin is ethylene, or C4-C10 alpha-olefin, and preferably selected from ethylene, 1-butene, 1-hexene, and 1-octene.

In one embodiment, the olefin-based polymer is a propylene/alpha-olefin copolymer. In a further embodiment, the alpha-olefin is a C2, or C4-C10 alpha-olefin, and preferably selected from ethylene, 1-butene, 1-hexene, and 1-octene.

In one embodiment, the olefin-based polymer is a polypropylene homopolymer.

In one embodiment, the olefin-based polymer has a density ≤0.980 g/cc; or ≤0.970 g/cc; or ≤0.960 g/cc (1 cc=1 $cm^3$).

In one embodiment, the olefin-based polymer has a density less than, or equal to, 0.950 g/cc; or less than, or equal to, 0.940 g/cc; or less than, or equal to, 0.930 g/cc. In one embodiment, the olefin-based polymer has a density less than, or equal to, 0.920 g/cc; or less than, or equal to, 0.910 g/cc; or less than, or equal to, 0.900 g/cc.

In one embodiment, the olefin-based polymer has a density greater than, or equal to, 0.850 g/cc; or greater than, or equal to, 0.860 g/cc; or greater than, or equal to, 0.870 g/cc.

In one embodiment, the olefin-based polymer has a density from 0.850 g/cc to 0.980 g/cc, or from 0.860 g/cc to 0.960 g/cc, or from 0.870 g/cc to 0.940 g/cc.

In one embodiment, the olefin-based polymer comprises from 2 mole percent to 29 mole percent of an alpha-olefin, as determined by $^{13}C$ NMR. Preferred alpha-olefins are discussed above.

In one embodiment, the olefin-based polymer comprises from 5 mole percent to 9 mole percent of an alpha-olefin, as determined by $^{13}C$ NMR. Preferred alpha-olefins are discussed above.

Olefin-based polymers include, but are not limited to, low density polyethylene (LDPE), high density polyethylene (HDPE), heterogeneously branched linear polymers (include Ziegler-Nana polymerized polymers, such as LLDPE, and include products such as DOWLEX Linear Low Density Polyethylene (LLDPE) available from The Dow Chemical Company), homogeneously branched substantially linear polymer (such as AFFINITY Polyolefin Plastomers and ENGAGE Polyolefin Elastomers, both available from The Dow Chemical Company) homogeneously branched linear polymers (such as EXACT Polymers available from ExxonMobil), and olefin multiblock copolymers (such as INFUSE Olefin Block Copolymers available from The Dow Chemical Company). Olefin-based polymers also include polypropylene homopolymers, impact propylene based copolymers, and random propylene based copolymers. An olefin-based polymer may comprise a combination of two or more embodiments as described herein.

Definitions

Unless stated to the contrary, implicit from the context, or customary in the art, all parts and percents are based on weight, and all test methods are current as of the filing date of this disclosure.

The term "support material," as used herein, refers to a material which exists, in the fluid stream, as a solid form, in a chromatographic process, including processes that change the temperature of the support material, and/or change the solvent composition. An inert material, as used herein, in reference to a support material, refers to a material that does not undergo chemical and/or physical transformation when used as a support material or as a component of a support material.

An inert material, as used herein, in reference to a filler, refers to a material that does not undergo chemical and/or physical transformation when used as a support material or as a component of a support material.

The term "surface composition," as used herein, refers to the chemical structures located on the surface of a support material. One can use x-ray diffraction and/or EDX to determine the surface composition.

The term "solvent," as used herein, refers to a substance, or a mixture of substances (for example, liquids), capable of dissolving another substance (solute).

The term "eluent," as used herein, refers to a solvent used in a chromatography process to move, or elute, one or more substances from a stationary support material.

The term "spherical particles," as used herein, refers to totally round, or almost round particles with minor surface variations, such that, for a sample of particles containing at least 100 particles, the ratio of largest diameter to the smallest diameter of each particle be less than or equal to two, as determined by scanning electron microscopy.

The term "surface coating layer," as used herein, refers to a coating on the outer surfaces on the particles of a support material. Typically at least 95 area percent of the total surface area of a sample of particles is coated. The amount of surface coating can be determined by SEM (Scanning Electron Microscopy).

The term "elemental form," as used herein, in reference to a metal, refers to the metal in a valence state of zero (0).

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities, for example, catalyst residues, may be incorporated into and/or within a polymer.

The term "interpolymer," as used herein, refers to polymers prepared by the polymerization of at least two different types of monomers. The generic term interpolymer includes copolymers (employed to refer to polymers prepared from two different monomers), and polymers prepared from more than two different types of monomers.

The term "olefin-based polymer," as used herein, refers to a polymer that comprises a majority amount of polymerized olefin monomer, for example ethylene or propylene, (based on weight of the polymer) and, optionally, at least one comonomer.

The term "ethylene-based polymer," as used herein, refers to a polymer that comprises a majority amount of polymerized ethylene monomer (based on weight of the polymer) and, optionally, at least one comonomer.

The term "ethylene-based interpolymer," as used herein, refers to an interpolymer that comprises a majority amount of polymerized ethylene monomer (based on weight of the interpolymer) and at least one comonomer.

The term "ethylene-based copolymer," as used herein, refers to a copolymer that comprises a majority amount of polymerized ethylene monomer (based on weight of the copolymer) and one comonomer, as the only two monomer types.

The term "ethylene/α-olefin interpolymer," as used herein, refers to an interpolymer that comprises a majority amount of polymerized ethylene monomer (based on the weight of the interpolymer) and at least one α-olefin.

The term, "ethylene/α-olefin copolymer," as used herein, refers to a copolymer that comprises a majority amount of polymerized ethylene monomer (based on the weight of the copolymer), and an α-olefin, as the only two monomer types.

The term, "polyethylene homopolymer," as used herein, refers to a polymer that comprises only polymerized ethylene monomer.

The term "propylene-based polymer," as used herein, refers to a polymer that comprises a majority amount of polymerized propylene monomer (based on weight of the polymer) and, optionally, at least one comonomer.

The term "propylene-based interpolymer," as used herein, refers to an interpolymer that comprises a majority amount of polymerized propylene monomer (based on weight of the interpolymer) and at least one comonomer.

The term "propylene-based copolymer," as used herein, refers to a copolymer that comprises a majority amount of polymerized propylene monomer (based on weight of the copolymer) and one comonomer, as the only two monomer types.

The term "propylene/α-olefin interpolymer," as used herein, refers to an interpolymer that comprises a majority amount of polymerized propylene monomer (based on the weight of the interpolymer) and at least one α-olefin.

The term, "propylene/α-olefin copolymer," as used herein, refers to a copolymer that comprises a majority amount of polymerized propylene monomer (based on the weight of the copolymer), and an α-olefin, as the only two monomer types.

The term "composition," as used herein, includes a mixture of materials which comprise the composition, as well as reaction products and decomposition products formed from the materials of the composition.

The term "multidimensional chromatography," as used herein, refers to the coupling together of multiple separation mechanisms (for example, see J. C. Giddings (1990), Use of Multiple Dimensions in Analytical Separations, in Hernan Cortes Editor, *Multidimensional Chromatography: Techniques and Applications* (1st ed. pp. 1), New York, N.Y.: Marcel Dekker, Inc.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically listed.

The term "temperature gradient chromatography," as used herein, refers to a separation technique, typically a polymer separation, based on a temperature gradient. Preferred examples include TREF and CEF.

The term "TREF," as used herein, refers to Temperature Rising Elution Fractionation chromatography that uses a separation technique based on the different crystallizations of the polymer molecules within a polymer sample, and which uses a static or zero eluent flow during the crystallization (cooling) of the polymer sample onto a stationary support.

The term "CEF," as used herein, refers to Crystallization Elution Fractionation chromatography that uses a separation technique based on the different crystallizations of the polymer molecules within a polymer sample, and which uses a dynamic eluent flow during the crystallization (cooling) of the polymer sample onto a stationary support.

Test Methods

Crystallization Elution Fractionation (CEF)

The Crystallization Elution Fractionation analysis is conducted according to Monrabal et al, *Macromol. Symp.* 257, 71-79 (2007). The CEF instrument is equipped with an IR-5 detector (such as that sold commercially from PolymerChar, Spain) and a two angle light scattering detector Model 2040 (such as those sold commercially from Agilent). Orthodichlorobenzene (ODCB, 99% anhydrous grade) and Silica gel 40 (particle size 0.2~0.5 mm) (such as commercially available from EMD Chemicals) are obtained. The silica gel is dried in a vacuum oven at 160° C. for at least two hours before use. The ODCB is sparged with dried nitrogen ($N_2$) for one hour before use. Dried nitrogen is obtained by passing nitrogen at <90 psig over dried $CaCO_3$ and 5 Å molecular sieves. The ODCB is further dried by adding five grams of the dried silica to two liters of ODCB, or by pumping the ODCB through a column or columns packed with dried silica, at 0.1 mL/min to 2.0 ml/min. Dried ODCB is hereinafter referred to as "ODCB-m." A sample solution is prepared, using the autosampler, by dissolving a polymer sample in ODCB-m, at 4 mg/ml (32 mg of sample in 8 mL of ODCB-m), under shaking at 160° C. for 60 minutes. The sample solution (300 µL) is injected into the column (see expt. section for column for each analysis). The temperature profile of the CEF is as follows: crystallization at 3.0° C./min, from 95° C. to 30° C.; thermal equilibrium at 30° C. for 0, 1 or 2 minutes; isothermal elution at 30° C. for 2 or 3 minutes, and then at 3.0° C./min from 30° C. to 140° C. The flow rate during crystallization is 0.03 mL/min. The flow rate during elution is 0.50 mL/min. The IR-5 signal data is collected at one data point/second.

Data processing is performed with "GPCOne" software (PolymerChar, Spain). The chromatogram is integrated with "GPCOne" software. A straight baseline is drawn from the visible difference, when the peak falls to a flat baseline at high elution temperature, and the minimum or flat region of detector signal on the low temperature side of the soluble fraction (SF). The upper temperature integration limit is established, based on the visible difference, when the peak falls to the flat baseline region (roughly around 120° C.). The lower temperature integration limit is established, based on the intersection point of baseline with the chromatogram including the soluble fraction. Temperature calibration of the CEF is performed by using a mixture of NIST Standard Reference Material linear polyethylene 1484a (1.0 mg/ml) and EICOSANE (2 mg/ml) in ODCB-m. The calibration consists of four steps: (1) calculating the delay volume defined as the temperature offset between the measured peak elution temperature of EICOSANE minus 30.00° C.; (2) subtracting the temperature offset of the elution temperature from the CEF raw temperature data (it is noted that this temperature offset is a function of experimental conditions, such as elution temperature, elution flow rate, etc.); (3) creating a linear calibration line, transforming the elution temperature across a range from 30.00° C. to 140.00° C., such that NIST linear polyethylene 1484a has a peak temperature at 101.00° C., and EICOSANE has a peak temperature of 30.00° C.; (4) for the soluble fraction measured isothermally at 30° C., linearly extrapolating the elution temperature by using the elution heating rate of 3° C./min. Other linear homopolymer polyethylene samples having an equivalent or similar weight average molecular weight as NIST 1484a (110,000 to 125,000 Daltons) and polydispersity (Mw/Mn from 1.0 to 2.8) can be used.

Temperature Rising Elution Fractionation (TREF)

The TREF experiment and data processing are performed in a manner similar to the CEF, as discussed above, except that the flow rate during cooling is set to zero. The temperature calibration is same as CEF.

Wild TREF

The experimental steps of the temperature rising elution fractionation (TREF) were those as reported according to the Wild publication (Wild et al, *Journal of Polymer Science, Poly. Phys. Ed.*, Vol. 20, p. 441 (1982)).

Temperature Profile of Wild TREF

The temperature profile of Wild TREF is as follows: isothermal cooling at 125° C. for 30 minutes; cooling at 0.125° C./min from 125° C. to 100° C., followed by 0.025° C./min from 100° C. to 25° C.; then thermal equilibrium at 25° C. for 1000 minutes; isothermal elution at 25° C. for 1 minute; and then at 20° C. per hour, from 30° C. to 102° C.; then followed by isothermal elution at 102° C. for 60 minutes. The flow rate during the elution is 4 mL/min.

Detector of Wild TREF

Infrared detector IR4 (PolymerChar, Spain) is used as the detector. The IR4 infrared detector is allowed to stabilize before the analysis. The pump is initiated at 1.0 mL/min, and the flow is increased to 4.0 mL/min over a 5-minute time span. The infrared detector output is zeroed according to the manufacturer's instructions, and the column is purge to equilibrium for at least 30 minutes, until the baseline is essentially flat and changing little, if any. The nominal heating rate is 20° C. per hour during the program.

Particle Size Distribution (D50, D10, D90)

The particle size distribution is measured with an ACCUSIZER 780 OPTICAL PARTICLE SIZER (Particle Size System, Florida, USA), and uses the principle of Single Particle Optical Sizing (SPOS) to count and size particles, one at a time, thus eliminating missed particles, and providing accurate particle size and count information. The illumination/detection system, in the sensor, is designed to provide a monotonic increase in pulse height with increasing particle diameter. The standard calibration curve is obtained by measuring a series of standard polystyrene latex samples from NIST Traceable Monodisperse Standards (Duke). The detailed procedure for calibration can be found in the operation manual provided by Particle Size System. A particle size distribution (PSD) is constructed by counting a large amount of particles (at least 55,000 particles). The sample (particles) is suspended in methanol (HPLC grade; other suitable solvents include mineral oil or silicon oil), at low enough concentration, to avoid coincidence counting (two particles in sensoring zone), according to the operation procedure provided by Particle Size System. The D50, D10 and D90, each on a volume basis, are calculated by the software of ACCUSIZER 780. Other solvents suitable include TCB (HPLC grade) and ODCB (HPLC grade). The median diameter (D50, typically in micron), is defined as the particle diameter where half of the mass distribution (volume distribution) resides above this point, and half resides below this point. D10 is defined as the particle diameter where 10% of the mass lies below this point (D10). D90 is defined as the particle diameter that 90 percent of the mass lies below this point (D90).

Electronegativity of the Support Material

The surface property of the support material is first characterized by scanning electron microscopy with energy dispersive X-ray spectroscopy (SEM/EDX). Elemental analysis is performed by using a Bruker AXS X-Flash 30 mm$^2$ Silicon Drift Detector (SDD)/EDX system on a FEI Nova NanoSEM 600, equipped with an Everhart-Thornley secondary electron (SE) detector, and a solid state backscatter (BSE) detector operated at a 20 kV accelerating voltage. Instrument conditions are as follows: a working distance of approximately 6-7 mm, aperture No. 5, and spot size 5.5.

Electronegativity of an atom is a measure of the tendency of the atom to attract a bonding pair of electrons. Electronegativity of the support material is determined by each atom identified on the surface of support material by SEM/EDX. The Pauling scale is used. Fluorine (the most electronegative element) is assigned a value of 4.0, and values range down to Cesium and Francium which are the least electronegative, each at 0.7. The values of electronegativity for other atoms are listed in the references (W. W. Porterfield in *Inorganic Chemistry, a Unified Approach*, Addison Wesley Publishing Co., Reading Mass., USA, 1984. A. M. James and M. P. Lord in *Macmillan's Chemical and Physical Data*, Macmillan, London, U K, 1992). Table 1A shows the EXD results (the percentage of the surface components) of the comparative support materials of soda-lime glass with an average particle size (D50) of 125 microns.

TABLE 1A

| EXD Results | | | | | | | |
|---|---|---|---|---|---|---|---|
| Spectrum | | | | | | | |
| C | O | Na | Mg | Al | Si | Cl | Ca |
| Mass % 1.81 | 31.23 | 9.12 | 1.17 | 0.32 | 42.96 | 0.87 | 6.51 |

Durability Test

The durability test uses 40 consecutive, separate CEF or TREF analyses of a reference. For the studies herein, the reference material is DOWLEX 2056A or DOWLEX 2045. The peak area of the highest temperature elution peak of DOWLEX 2056A or DOWLEX 2045 (for example, see FIG. 2) can be obtained from the CEF chromatogram. The experimental conditions for CEF or TREF are listed above. The Calculation of $H_I$ and $A_O$ Comprises the Following Steps:

1. Analyze the reference material with CEF or TREF, using 40 separate, consecutive analyses; for each analysis, a fresh sample is used for the injection.

2. For each analysis, obtain the SCBD distribution which displays the "$dW_f/dT$ versus the elution temperature" for each CEF or TREF analysis, where $dW_f/dT$ is the weight fraction ($W_f$) of the polymer eluting at temperature of T (for a total of 40 chromatograms).

3. For each chromatogram, determine the elution temperature valley for the soluble fraction, $T_{SF}$. The $T_{SF}$ is defined as the elution temperature at baseline or lowest intensity ($dW_f/dT$), right after soluble fraction elutes. Typically, for the SCBD distribution, $T_{SF}$ is located between the "lowest TREF elution temperature or lowest CEF elution temperature" and 40° C. For each chromatogram, determine the elution valley temperature ($T_v$) at the peak valley of the highest temperature elution peak. The valley should lie between 86° C. and 100° C., where it is the minimum height between 86° C. and 100° C. (see FIG. 2);

4. Calculate the peak area (%) of the elution peak ($H_I$) occurring at the highest elution temperature, for each separate, consecutive CEF or TREF analysis:

$$H_I = \frac{\int_{T_v}^{upper\,intergration\,limit} dW_f/dT * dT}{\int_{T_{SF}}^{upper\,intergration\,limit} dW_f/dT * dT} * 100\%.$$

5. Plot the $H_I$ of each consecutive CEF or TREF analysis versus the number of the respective consecutive CEF or TREF analysis, according to a linear correlation equation of $H_I$=m*number of the consecutive injection+B with the correlation coefficient of $R^2$. For example, use a linear regression from EXCEL. For the linear regression, determine the values for the slope (m), the intercept (B), and correlation coefficient ($R^2$ or R2).

Density

Samples are prepared according to ASTM D 1928. Measurements are made within one hour of sample pressing using ASTM D792, Method B.

Melt Index

Melt index, MI or $I_2$, is measured in accordance with ASTM D 1238, Condition 190° C./2.16 kg, and is reported in grams eluted per 10 minutes. The "$I_{10}$" melt index is measured in accordance with ASTM D 1238, Condition 190° C./10 kg, and is reported in grams eluted per 10 minutes. For propylene-based polymers, the melt flow rate (MFR) is measured in accordance with ASTM D-1238, condition 230° C./2.16 kg.

Gel Permeation Chromatography

The chromatographic system consists of either a Polymer Laboratories Model PL-210 (Agilent) or a Polymer Laboratories Model PL-220 (Agilent) or PolymerChar HT GPC (Spain). The column and carousel compartments are operated at 140° C. Three Polymer Laboratories, 10-µm Mixed-B columns are used with a solvent of 1,2,4-trichlorobenzene. The samples are prepared at a concentration of "0.1 g of polymer" in "50 mL of solvent" or "16 mg of polymer in 8 mL of solvent." The solvent used to prepare the samples contain 200 ppm of BHT. Samples are prepared by agitating lightly for four hours, at 160° C. The injection volume used is "100 microliters," and the flow rate is "1.0 mL/min." Calibration of the GPC column set is performed with twenty one narrow molecular weight distribution polystyrene standards purchased from Polymer Laboratories. The molecular weight (MW) of the standards ranges from 580 to 8,400,000 g/mol, and the standards are contained in six "cocktail" mixtures. Each standard mixture has at least a decade of separation between individual molecular weights. The standards are purchased from Polymer Laboratories (Shropshire, UK). The polystyrene standards are prepared at "0.001 g in 20 mL of solvent" for molecular weights equal to, or greater than, 1,000,000 g/mol, and at "0.005 g in 20 mL of solvent" for molecular weights less than 1,000,000 g/mol.

The polystyrene standard peak molecular weights are converted to polyethylene molecular weights using Equation 1:

$$M\text{polyethylene}=A(M\text{polystyrene})^B \qquad (Eq.\ 1),$$

where M is the molecular weight, A has a value of 0.4316 and B is equal to 1.0 (T. Williams and I. M. Ward, *Polym. Letters*, 6, 621-624 (1968)). A third order polynomial is determined to build the logarithmic molecular weight calibration as a function of elution volume. Polyethylene equivalent molecular weight calculations are performed using VISCOTEK TriSEC software Version 3.0 for Agilent GPC instrument or GPCOne software for PolymerChar GPC instrument.

EXPERIMENTAL

Polymers

DOWLEX 2056A Polyethylene Resin or DOWLEX 2045 Polyethylene Resin are the commercial products available from The Dow Chemical Company.

Two ethylene octene random copolymers made by single site catalyst with a narrow SCBD (mono-mode excluding less than 2% of soluble fraction) are used. An ethylene octene random copolymer A (EO-A) with a density 0.9239, Mw of 102,900 Daltons, Mw/Mn of 2.2, $I_2$ of 1.0, $I_{10}/I_2$ of 6.4; and an ethylene octene random copolymer B (EO-B) with a density 0.9567, Mw of 104,000 Daltons, Mw/Mn of 2.0, $I_2$ of 1.0 and $I_{10}/I_2$ of 6.7.

Column Preparation

Hardware for Packing Columns (Inventive and Comparative Examples)—CEF and TREF

Stainless steel column, frit, end fitting of the column were obtained from Agilent Technologies (previously Polymer-Lab Inc.). An Agilent Model 1100 Liquid Chromatography Pump was used for the slurry packing method. TCB (1,2, 4-trichloro-benzene) was the slurry medium. A slurry packing reservoir was constructed of "0.46 cm" internal diameter stainless steel tubing with Valco end fittings. The reservoir was 100 mm in length. A standard ¼" outside diameter tube union was used to connect the packing reservoir to the empty analytical column.

Methodologies for Packing Columns (Inventive and Comparative) CEF and TREF

The columns for use in CEF and TREF included the following:

1. Packed columns that exhibit good mass transfer properties, including low back pressure at standard operating conditions of flow and temperature, low sensitivity to shock from abruptly changing conditions, and lack of channels and void spaces.

Packed columns have sufficient internal liquid volume to permit the studies of the effect of dynamic cooling on component resolution. The dynamic cooling was a process of using a slow flow during the cooling process of CEF (Monrabal et al, *Macromol. Symp.* 257, 71-79 (2007)). Two methodologies of preparing columns were used: (1) dry packing by using the tap-and-fill method, in which the added material was settled by tapping the column, or using an electric vibrating tool; and (2) slurry packing method, which uses a suspension or slurry of the substrate, where the slurry was pumped into the column under flowing conditions (Striegel, Yau, et al., *Modern Size Exclusion Liquid Chromatography*, Wiley, the $2^{nd}$ edition, Chapter 6).

For the dry packing approach, simple tap-and-fill method, the column was suspended vertically. Packing material was added in small increments through a funnel, while the column being tapped or vibrated to settle the substrate. When the packing material was level with the end of the column, the end fitting was added, and the column was tightened. It was a standard practice to condition the columns prior to use, and to inspect the bed for settling or voids. If voids were found, more packing material was added to level the end of the column.

For the slurry packing method, the substrate materials (also commonly called packing materials) were dry added to the empty column. The reservoir and column with end fitting was then assembled, and connected to the Agilent pump. TCB (1,2,4-trichloro-benzene) was pumped upward, at a flow of 1 mL/min, through the reservoir, until air was displaced from the column. The flow was momentarily stopped, the column and reservoir was then inverted to a down-flow position. TCB was pumped at 2-5 mL/min through the column for at least twenty minutes, or until the system pressure reaches 2500 PSIG. The column was disconnected from the packing reservoir, and any excess packing material at the end of the column was removed with a flat blade scraper, to provide an even level with the end of the tubing. The end fitting was tightened into place, and the column was ready for conditioning.

Column Conditioning (Comparative and Inventive) CEF and TREF

The newly packed column was installed in the CEF or TREF chromatograph, and flow was established at 0.1 mL/min at room temperature. Depending on the material, and how efficiently it was packed, the back pressure at this point was usually 2-10 Bars. The flow was increased in steps of 0.1 mL/min, allowing the pressure to stabilize between each increase, up to either 0.7 or 1.0 mL/min. The column temperature was increased to 60° C., and then a linear temperature ramp was used to heat the column, under flow, to 140° C. at 10° C./min. This final temperature was held for 20 minutes, and then the column was cooled at 10° C./min to 100° C., and ready for testing.

Column Loading and Crystallization Steps for Wild TREF (Same for Both Comparative and Inventive, Except for Support Material)

The column used for the experiment was a "5 inches by 1 inch (L/W)," made of stainless steel, and capped with Valco 1" diameter frits, radial distributors, and end fettlings. The end fittings were connected to 1/16" Valco stainless steel ferrules and nuts. The packing material was CHROMOSORB™ PNAW solid phase support, received in the 60 to 80 mesh size range, and screened through a 70 mesh sieve to remove fines, so the support was nominally 70 to 80 mesh.

One 5" length of 1" OD stainless steel (SS) tubing was cleaned, followed by a final acetone rinse, and air dry. On each end of the tube, the end fitting retainer nut and ferrule were installed. On one end, the end fitting, containing in order, the radial distribution plate, followed by the fritted filter disk were placed; and the end fitting was tightened using a vice and wrench. The column packing, CHROMOSORB PNAW 60/80 MESH (non-acid washed) (fractionated as above), was weighed (24 grams) into a disposable pan.

The column set was clamped vertically, with the end fitting on the bottom. A second 5" lengths of 1" tubing was added at the top of the column using one inch union. Packing material (24 grams) (CHROMOSORB PNAW 60/80 MESH (non-acid washed) (fractionated as above) was also added. A vacuum line (approximately −20 inches of Hg) was connected to the original lower end fitting, but a vacuum was not applied as yet. Acetone (20 mL) was added to the open 1" tube, place the end fitting with a plug on the open tube. The joined tubes were inverted, with mild shaking several times, to disperse the packing and acetone, and the tubes were placed back in the original vertical position. The upper end fitting was removed, and the vacuum source was opened, pulling acetone into a suitable receiver using above vacuum. Small volumes (1-2 ml) of acetone were added to the open, top tube, to rinse the walls and help to settle the packing. When the liquid sank below the level of the packing, and all the packing was settled into the bed, the vacuum source was turned off and disconnected, before replacing the plug in the lower end fitting. The retainer nuts were carefully unscrewed, holding the column union in place, and the two columns were separated. With a flat blade spatula, any excess packing was scraped away, leaving a leveled surface of packing at the tube end. The remaining clean, assembled end fitting was placed on the column, and both end fittings were tightened with a wrench. The packed column was connected to the HPLC pump, with an exit line from the column to a waste receiver. TCB, at approximately 0.5 mL/min, was pumped through the column, gradually increasing the flow rate to 4.0 mL/min, over a 20 minute period, while observing the column for leaks, and retighten the end fittings if necessary. The column was now ready for use.

Sample (Polymer Solution) Loading for Wild TREF (Comparative and Inventive)

Prior to loading the sample onto the column, a polymer solution was prepared at 0.5% by weight, in 1,2,4-trichlorobenzene (TCB), at 160° C. for two hours. The column was heated to 130° C. in an oil bath. Using a vacuum line, about 20 mL of hot TCB was pulled through the column to heat the sample transfer line. Then the vacuum was used to pull 20 mL of sample solution through the column, followed by 2 mL of hot TCB to clear the line.

Properties of Support Materials of CEF and TREF

Glass beads at 125 microns, were purchased from MO-SCI Specialty Products (4040 HyPoint North, Rolla, Mo. 65401 USA), with the part number of GL0191B6/125AW. The particle size was 125 μm±6%, with a spherical percentage ≥90% according to MO-SCI Specialty Products.

Yttrium-Stabilized Zirconia Micro at 112 to 125 microns (Catalogue # YSZMS-6.05, 112-125 um), were purchased from Cospheric LLC (Santa Barbara, Calif., USA). The percentage of particles in the stated size range was reported as >90%. Spherical Particles were reported as >90%.

Soda lime, solid glass microsphere particles (Catalogue # P 2015 SL), with a particle size D50 of 9 microns, were purchased from Cospheric LLC (Santa Barbara, Calif., USA).

Silane coated soda lime, solid glass microsphere particles (Catalogue # P 2015SL-S2), with a particle size D50 of 10 microns, were purchased from Cospheric LLC (Santa Barbara, Calif., USA).

Two grades of solid glass particles with a particle size 8.5 to 12 microns, and 27 microns, respectively, were purchased from Cospheric LLC (Santa Barbara, Calif., USA). The particles in the specified size range were reported as >90%, which means that greater than 90% of the particles fell with the respective diameter size for each grade.

Yttrium stabilized zirconia microspheres were purchased from Cospheric LLC (Santa Barbara, Calif., USA). The particles in the specified size range were reported as >90%, which means that greater than 90% of the particles fell with the diameter size of 112 to 125 microns.

Stainless steel particles were obtained from VULKAN BLAST SHOT with Chronital 10, at diameter of 0.05-0.2 mm at mesh size of 170-100. These particles were washed and size fractionated before use. The detailed washing procedure for the stainless steel particles was as follows:

(1) Prepare 1% nitric acid by slowly adding concentrated nitric acid directly into deionized water under stirring.
(2) Place half a pound of stainless steel particle into an 8 ounce glass bottle with a 1.5 inch PTFE magnetic stirring bar.
(3) Wash stainless steel particles with detergent and water extensively to get rid of dirt and magnetic particles (i.e. magnetic stir bar attracted magnetic particles). Attracted magnet particles were removed from magnetic stirring bar by wiping with paper towel.
(4) Repeat (3) several times till water appeared clear and colorless, and no magnetic particles appeared to stick on magnetic stirring bar.
(5) Wash with acetone to get rid of organic contaminants. Repeat several times until acetone appeared clear and colorless.
(6) Rinse with de-ionized water to get rid of residual acetone.
(7) Add 1% nitric acid to cover stainless steel particles. The mixture was stirred with a glass rod for 5 minutes and kept under fume hood for 30 min with occasional stirring. The solution was carefully decanted. The particles was rinsed several times with deionized water until the water appeared clear and colorless.
(8) Repeat Step (7) several times or until the nitric acid solution appeared clear and almost colorless. It is impossible to get a colorless nitric solution. The shot contains some metal elements that are chemically active enough to dissolve in 1% nitric acid.
(9) Dry the shot under vacuum oven at 60° C. under $N_2$ to minimize possible oxidation of fresh surface of the particles.

After this cleaning procedure, stainless steel particles were fractionated by using metal sieves to collect the particles with diameter of 105 to 125 microns. Gold coated nickel particles had D50 of 10.5 microns, D10 of 8.5 microns, and D90 of 13.4 microns. Gold coated nickel particles were purchased from Oerlikon Metco (Canada) Inc., and from Nippon Chemical Industrial Co.

Spherical gold particles (Catalogue #42675) were purchased from Alfa Aescar A Johnson Matthey Company (USA) with D50 of 6.2 microns, D10 of less than 6.1 microns, and D90 of less than 23.3 microns. The specific surface area reported by the manufacturer was 0.08 $m^2/g$. Table 1 shows the characteristics of the support materials used in the inventive method and comparative method. Copper particles (APS 10 microns) were purchased from Alfa Aesar, Thermo Fisher scientific Chemicals, Inc.

TABLE 1

Support Materials

| Support material | Averaged particle diameter (microns) | Electro-negativity | Surface stability | Porous | Packing method |
|---|---|---|---|---|---|
| Gold coated nickel particles | 10.5 (D50) | 2.4 (Au) | Stable in acidic condition | None | Slurry packing |
| Spherical gold particles | 6.2 (D50) | 2.4 (Au) | Stable in acidic condition | None | Slurry packing |
| Silane coated soda-lime glass microsphere | 8.5-12 D50 | 0.93(Na), 1.31(Mg), 1.00(Ca), 1.50(Al) | Unstable in acidic condition | None | Slurry packing |
| Solid glass particles | 27 (D50) | 0.93(Na), 1.31(Mg), 1.00(Ca), 1.50(Al) | Unstable in acidic condition | None | Slurry packing |
| Soda-lime glass beads | 125 (D50) | 0.93(Na) 1.31(Mg) 1.00(Ca) 1.50(Al) | Unstable in acidic condition | None | Dry packing |
| Stainless steel particles | 105-125 (D50) | 1.8 (Fe) 1.6 (Cr) | Unstable in acidic condition | None | Dry packing |
| Yttrium Stabilized Zirconia Microspheres | 112-125 (D50) | 1.2 (Y) 1.33(Zr) | Unstable in acidic condition | None | Dry packing |

Study 1: CEF (One Polymer): Different Support Materials

The inventive and comparative analyses were run using the CEF method described above. The Wild TREF uses a very slow cooling rate of 0.025° C./min, and a heating rate of 20° C. per hour. Under the Wild TREF experimental conditions, no significant co-crystallization effect is observed (L Wild et al., Advances in Polymer Science 98, Springer-Verlag Berlin Heidelberg GmbH, P21). Owing to its superior accuracy, Wild TREF has been widely accepted as the golden standard SCBD method for polyolefins. Taking DOWLEX 2056A as an example, the highest temperature elution peak $A_o$ is measured at 13.4% with Wild TREF method (CHROMOSORB® PNAW that has a diameter range from 210 to 250 microns, available from Tek Lab, Baton Rouge, La.). When CI equals one, for SCBD analysis, the analysis has an equivalent degree of co-crystallization as Wild TREF. With the increase in co-crytallization in SCBD analysis, the area of the highest temperature peak ($A_I$) increases. The co-crystallization index (CI) becomes greater than one. Table 2 shows the CI values of the inventive analyses and the comparative analyze, each using DOWLEX 2056A. The comparative analyses produced values of CI from 1.67, up to 2.27, depending on the support material used, suggesting that the comparative analyses have much more co-crystallization than the Wild TREF analysis. The inventive analyses using support materials having CI values of 1.41 and less. Surprisingly, when using gold coated or gold particle, the CI values of the inventive analyses were 0.92 to 0.94, indicating the inventive analyses had less co-crystallization occurring as compared to the Wild TREF analysis. Also, the inventive analyses can produce at least equivalent, or likely more accurate, SCBD results, than the Wild TREF analysis.

TABLE 2

CI Results by CEF

| | Support material | Averaged particle size (microns) | Co-crystallization index (CI) | Cooling rate of the substrate material, °C./min | Heating rate of the substrate material, °C./min | Column dimension ID × Length (cm × cm) | Flow rate during cooling process, ml/min |
|---|---|---|---|---|---|---|---|
| Inventive analysis | Gold coated nickel particles | 10.5 | 0.92 | 3.0 | 3.0 | 0.46 × 25 | 0.03 |
| Inventive analysis | Spherical gold particles | 6.2 | 0.94 | 3.0 | 3.0 | 0.4 6 × 25 | 0.03 |
| Comparative analysis | Soda-lime glass microsphere | 8.5-12 | 1.70 | 3.0 | 3.0 | 0.46 × 25 | 0.03 |
| Inventive analysis | Solid glass particle | 27 | 1.41 | 3.0 | 3.0 | 0.46 × 25 | 0.03 |
| Inventive analysis | Copper particle | 10 | 1.12 | 3.0 | 3.0 | 0.46 × 25 | 0.03 |
| Comparative analysis | Silane coated soda-lime glass microsphere | 8.5-12 | 1.67 | 3.0 | 3.0 | 0.46 × 25 | 0.03 |
| Comparative analysis | Soda-lime glass beads | 125 | 1.80 | 3.0 | 3.0 | 0.46 × 25 | 0.05 |
| Comparative analysis | Stainless steel particles | 105-125 | 1.70 | 3.0 | 3.0 | 0.46 × 25 | 0.05 |
| Comparative analysis | Yttrium Stabilized Zirconia Microspheres | 112-125 | 2.27 | 3.0 | 3.0 | 0.46 × 25 | 0.05 |

Figure 4:
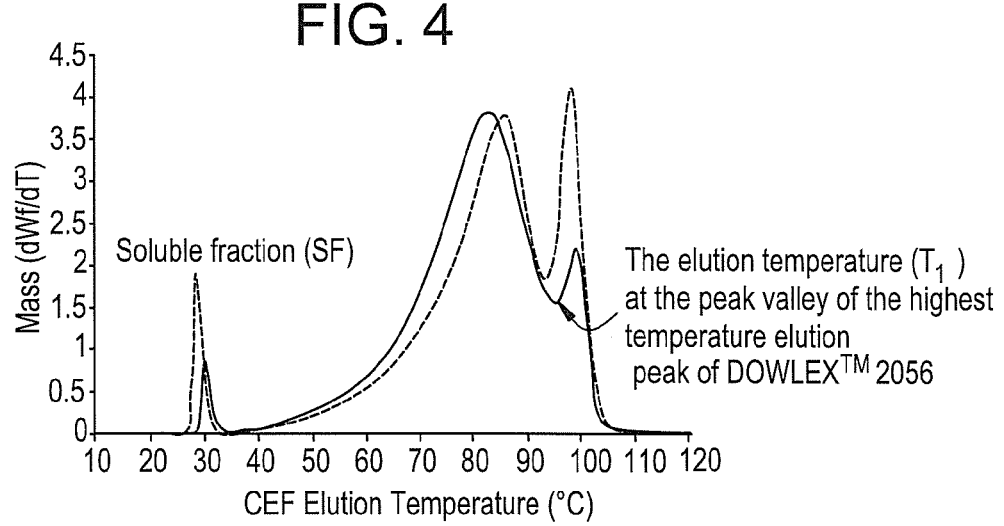
FIG. 4 is an overlay of a SCBD distribution (CEF) of DOWLEX 2056A, using an inventive analysis and a comparative analysis.

Another advantage of the inventive analysis is the balance between analysis time and accuracy. SCBD analysis includes sample dissolution, column loading, cooling, elution, and final cleaning steps. The analysis time is defined, herein, as the total time of cooling and elution steps only. The inventive analysis required 62 minutes, while Wild TREF needed at least 4500 minutes. In other words, the inventive analysis with gold particles or gold coated particle provides SCBD analysis, at about 1.4% of the time required for the Wild TREF analysis, while maintaining less or equivalent co-crystallization. This inventive analysis significantly boosts the sample throughput, without sacrificing accuracy. Minimization of co-crystallization of the inventive analysis can be further demonstrated by CEF chromatograms (SCBD distribution). FIG. 4 shows the CEF chromatogram overlay of the inventive analysis (Gold coated nickel with an averaged particle size of 10.5 micron) and comparative analysis by soda-lime glass with an averaged particle size of 125 microns, each using DOWLEX 2056A. Due to the co-crystallization, the comparative method measures the area of the highest temperature elution peak at a much higher value (23.8 wt %), than the inventive method by using Gold coated nickel, with an average particle size of 10.5 microns (12.2%). For the medium density peak (the amount of material eluting after soluble fraction and before $T_v$), defined in FIG. 2, the co-crytallization leads to a shift in elution temperature to a higher value for the comparative analysis as compared to the inventive analysis.

Study 2: TREF (One Polymer)—Different Support Materials

Figure 5:
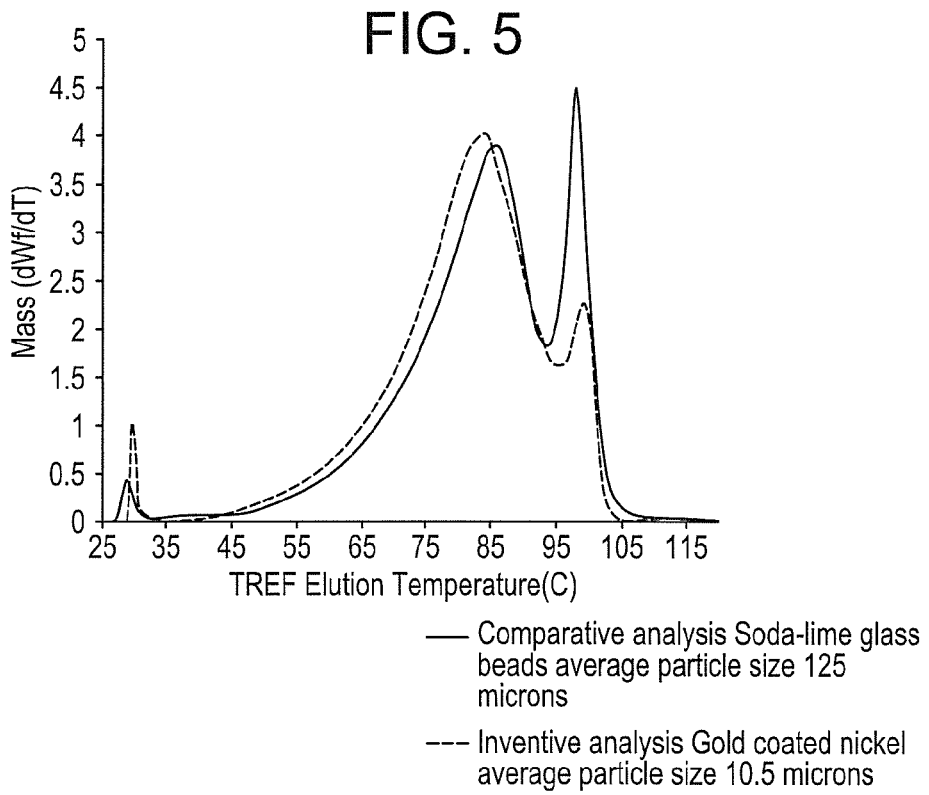
FIG. 5 is an overlay of a SCBD distribution (TREF) of DOWLEX 2056A, using an inventive analysis and a comparative analysis.

The only difference between CEF and TREF measurement, is that there is a slow flow during the cooling process of the analysis by CEF, while TREF uses static cooling where no flow is used during cooling. The inventive and comparative analyses were run using the TREF method described above which is same as CEF method except the flow rate during cooling is equal to zero). Table 3 shows the CI values of the inventive analysis and comparative analysis by using DOWLEX 2056A by TREF analysis. The comparative analysis produces a CI value of 1.81, using Soda-lime glass beads of 125 micron particle size. The inventive analysis produces a CI value of 0.92. This result indicates the inventive analysis generates much less co-crystallization than the comparative analysis. As discussed above, when the inventive analysis gives the same amount of co-crystallization as Wild TREF analysis, the CI value is equal to 1.0. The CI value of the inventive analysis using gold coated Ni particles was 0.92. The inventive analysis has co-crystallization less than that of Wild TREF analysis. In other words, the inventive analysis can produce more accurate SCBD results than the Wild TREF. FIG. 5 shows the overlay of SCBD distribution of DOWLEX 2056A by TREF, using the inventive analysis with gold coated nickel with averaged particle size (D50) of 10.5 micron, and a comparative analysis using soda-lime glass with an averaged particle size (D50) of 125 microns.

TABLE 3

CI Results by TREF (same experimental conditions as CEF, except the flow rate of zero mL/min during cooling step)

| | Support material | Averaged particle size (microns) | (CI) | Cooling rate of the substrate material, °C./min | Heating rate of the substrate material, °C./min | Column dimension ID × Length (cm × cm) | Flow rate during cooling (ml/min) | Total analysis time (min) |
|---|---|---|---|---|---|---|---|---|
| Inv. | Gold coated nickel particles | 10.5 | 0.92 | 3.0 | 3.0 | 0.46 × 25 | 0.00 | 62 |
| Comp | Soda-lime glass | 125 | 1.81 | 3.0 | 3.0 | 0.46 × 25 | 0.00 | 62 |

TABLE 3-continued

CI Results by TREF (same experimental conditions as CEF, except the flow rate of zero mL/min during cooling step)

| Support material | Averaged particle size (microns) | (CI) | Cooling rate of the substrate material, °C./min | Heating rate of the substrate material, °C./min | Column dimension ID × Length (cm × cm) | Flow rate during cooling (ml/min) | Total analysis time (min) |
|---|---|---|---|---|---|---|---|
| beads | | | | | | | |

Study 3: CEF—Two Polymer Blend—Different Support Materials

Figure 6:
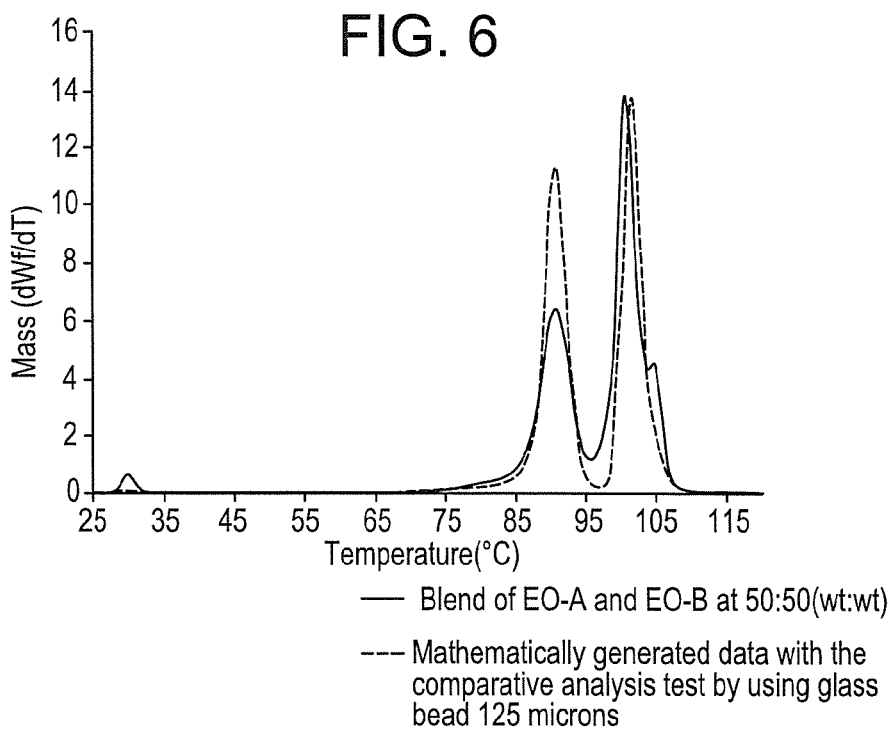
FIG. 6 is a mathematically constructed CEF chromatogram of the blend (EO-A/EO-B 50:50, wt:wt), and a CEF chromatogram of the blend using a comparative analysis (glass beads of 125 microns).
Figure 7:
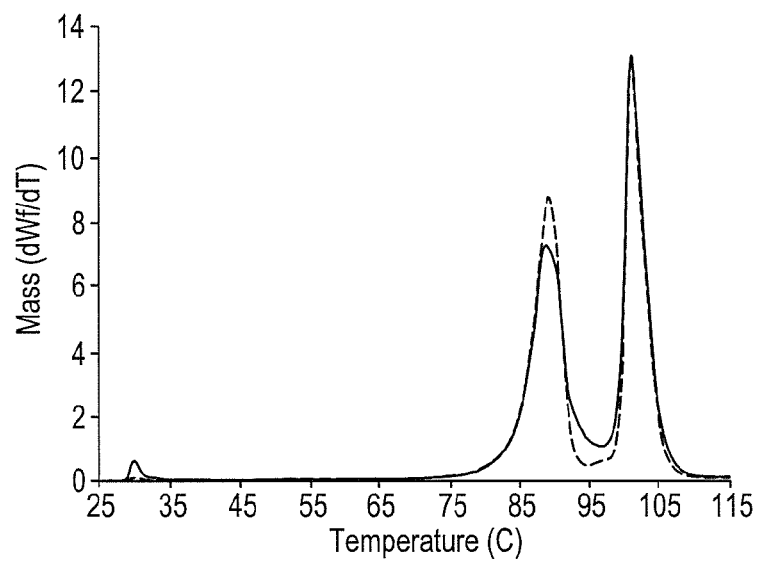
FIG. 7 is a mathematically constructed CEF chromatogram of the blend (EO-A/EO-B 50:50, wt:wt), and a CEF chromatogram of the blend using an inventive analysis (10.5 micron gold coated nickel particles).
Figure 8:
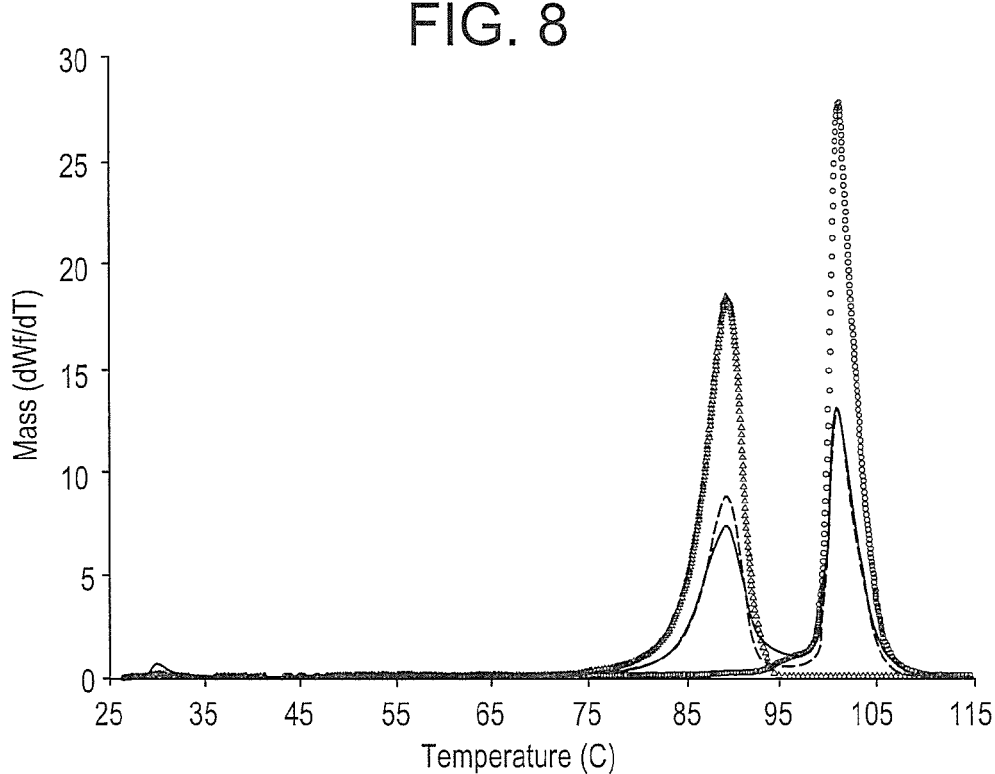
FIG. 8 is a mathematically constructed CEF chromatogram of the blend (EO-A/EO-B 50:50, wt:wt), and a CEF chromatogram of the blend using an inventive analysis (10.5 micron gold coated nickel particles), together with individual EO-A and EO-B chromatograms.

Co-crystallization can be also demonstrated by a blend. A blend was made by weighing same amount of an ethylene octene random copolymer A (EO-A, density 0.9239, $I_2$ 1.0, $I_{10}/I_2$ 6.4) and an ethylene octene random copolymer B (EO-B, density 0.9567, $I_2$ 1.0, $I_{10}/I_2$ 6.7), to give a final concentration of polymer in solution of 4.0 mg/mL. The overlay of the CEF chromatogram of the blend obtained experimentally, and the CEF chromatogram of the blend obtained by mathematical construction from each individual component, analyzed at 2 mg/mL, is shown in FIG. 6 (the comparative analysis) and FIG. 7 (the inventive analysis), and FIG. 8 (the inventive analysis with EO-A and EO-B individually). In the absence of co-crystallization, the mathematically constructed CEF chromatogram of the blend is equal to the experimentally measured CEF chromatogram of the blend. There is a significant difference between mathematically constructed chromatogram with the chromatogram obtained from the comparative analysis for the Blend (FIG. 6). On the other hand, the chromatogram obtained using an 'inventive analysis" overlays well with the mathematically constructed chromatogram for the Blend (FIG. 7 and FIG. 8). This clearly shows that the inventive analysis has much less co-crystallization than the comparative analysis for the blend.

See FIG. 6 for mathematically constructed chromatogram of the blend (EO-A/EO-B 50:50, wt:wt), and experimentally measured chromatogram of the blend by using comparative analysis test with glass beads of 125 microns (CEF Analysis). See FIG. 7 for a mathematically constructed chromatogram of the blend (EO-A/EO-B 50:50, wt:wt), and experimentally measured chromatogram of the blend by using inventive analysis test with 10.5 micron gold coated nickel particles (CEF analysis). See FIG. 8 for a mathematically constructed chromatogram of the blend (EO-A/EO-B 50:50, wt:wt), and experimentally measured chromatogram of the blend by using inventive analysis test with 10.5 micron gold coated nickel particles, together with individual EO-A and EO-B (CEF analysis).

Study 4: Durability of Support Material

Figure 9:
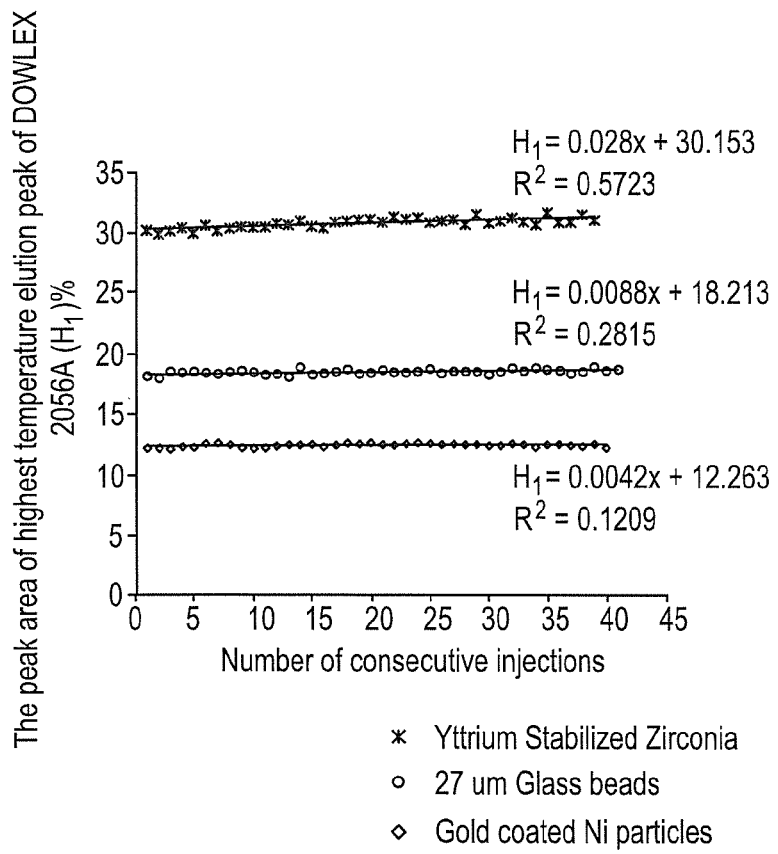
FIG. 9 depicts the durability results ($H_I$ versus number of consecutive injections) of the inventive analysis and the comparative analysis, using DOWLEX 2056A. The comparative analysis using 27 micron glass beads, 112-125 micron yttrium stabilized zirconia, and inventive analysis using 10.5 micron gold coated nickel particles.

The precision of the SCBD analysis largely depends on the stability of the support material. The peak area (%) of the highest temperature elution peak of DOWLEX 2056A or DOWLEX 2045 is expected to remain constant with a robust and stable SCBD analysis. FIG. 9 depicts the durability of an inventive analysis and two comparative analyses. Durability of the inventive analysis and the comparative analysis were each determined using DOWLEX 2056A. The comparative analyses used 27 micron glass beads, 112-125 micron yttrium stabilized zirconia, respectively, and the inventive analysis used 10.5 micron gold coated nickel particles. The slope of $H_I$ versus the number of consecutive injections (for 40 consecutive injections), for the inventive analysis was much lower than slope obtained for each comparative analysis. The correlation coefficient, $R^2$, of the inventive analysis was only 0.12, which indicated the absence of a significant correlation of $H_I$ versus the number of consecutive injections. Contrarily, the correlation coefficients of the comparative analyses were from 0.28 to 0.57, respectively, indicating the presence of a good correlation of the highest temperature elution fraction versus the number of injections. The higher the intercept of each linear correlation, the greater the amount co-crystallization in the analysis. The inventive analysis leads to significantly improved durability (improved repeatability and greater robustness) of SCBD analysis, as well as higher accuracy of the SCBD analysis.

It has been discovered that the inventive analyses using support materials with highly chemically inert surfaces, such as gold, have improved durability. On the other hand, glass is a material having liquid-liquid immiscibility (F. M. Ernsberger of PPG Industries, Properties of glass surfaces", 1972, Annu. Rev. Mater. Sci. 1972.2, 529). No two glass compositions behave precisely alike, and for a given composition, the microstructure is affected by the thermal history of a particular sample. The glassy microstructure grows, changes, and develops as a function of time and temperature of heat treatment. Acid washing is detrimental to the surface, since it leaches sodium and calcium, leaving a changed microstructure with surface irregularities. Soda-lime glass, including that containing boron, consists of two immiscible liquid phases. Phase segregation and microstructure rearrangement occur as a result of heat history, and continue with time, although these changes approach equilibrium eventually in years.

Stainless steel particles are the second commonly used support materials in crystallization based techniques. Stainless steel is an iron alloy with chromium and other metals. Stainless steel does not readily corrode, rust or stain in air or water, due to the presence of a passivation layer of chromium oxide ($Cr_2O_3$). However, in the presence of chlorinated solvent, at high temperatures, stainless steel particles are much less stable, than in water, or air, at room temperature. Chlorinated solvents, such as ODCB, can produce a low amount of HCl at high temperature, especially in the presence of $H_2O$, which can react with $Cr_2O_3$, leading to a constant change in the surface properties of stainless steel particles. It has been discovered that the inventive analyses using substrates with nickel coated gold or gold particles leads to a more homogeneous nucleation surface for the crystals of polyolefins to form and/or grow, yielding a minimized co-crystallization behavior and more stable SCBD analysis, as compared to the analyses using soda-lime glass beads or stainless steel particles.

The invention claimed is:
1. A method to analyze a polymer solution using a temperature gradient chromatography, said method comprising the following:

a) dissolving a composition comprising at least one polymer in at least one solvent, to form the polymer solution;
b) injecting at least a portion of the polymer solution onto a support material and wherein the support material has a Co-Crystallization Index (CI) from 0.70 to 1.50;
c) cooling the support material at a rate greater than, or equal to, 0.2° C./min;
d) increasing the temperature of the support material to elute at least some of the polymer;
e) generating a chromatogram.

2. The method of claim 1, wherein the temperature gradient chromatography is selected from the following: i) a crystallization elution fractionation (CEF) chromatography, or ii) a temperature rising elution fractionation (TREF) chromatography.

3. The method of claim 1, wherein the polymer is an olefin-based polymer.

4. The method of claim 1, wherein the support material comprises spherical particles that have D50 value less than, or equal to, 100 microns.

5. The method of claim 1, wherein the support material comprises one of the following: a) gold particles, b) gold coated particles, c) particles comprising gold, d) particles comprising a coating comprising gold, e) silver particles, f) silver coated particles, g) particles comprising silver, h) particles comprising a coating comprising silver, i) platinum particles, j) platinum coated particles, k) particles comprising platinum, l) particles comprising a coating comprising platinum, m) palladium particles, n) palladium coated particles, o) particles comprising palladium, p) particles comprising a coating comprising palladium, q) copper particles, r) copper coated particles, s) particles comprising copper, t) particles comprising a coating comprising copper, or u) a combination thereof.

6. An apparatus for polymer chromatography, comprising at least one column that comprises a support material, and wherein the support material has a Co-Crystallization Index (CI) from 0.70 to 1.50, and wherein the support material comprises an inert material.

7. The apparatus of claim 6, wherein the support material comprises one of the following: a) gold particles, b) gold coated particles, c) particles comprising gold, d) particles comprising a coating comprising gold, e) copper particles, f) copper coated particles, g) particles comprising copper, h) particles comprising a coating comprising copper, or i) a combination thereof.

* * * * *